(12) United States Patent
Kim

(10) Patent No.: US 7,862,925 B2
(45) Date of Patent: Jan. 4, 2011

(54) SECONDARY BATTERY

(75) Inventor: Kwang Chun Kim, Youngin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1000 days.

(21) Appl. No.: 11/234,832

(22) Filed: Sep. 23, 2005

(65) Prior Publication Data

US 2006/0099504 A1    May 11, 2006

(30) Foreign Application Priority Data

Sep. 24, 2004   (KR) ...................... 10-2004-0077222

(51) Int. Cl.
*H01M 2/26* (2006.01)
*H01M 2/14* (2006.01)
*H01M 6/10* (2006.01)

(52) U.S. Cl. .................. 429/94; 429/130; 429/161; 429/211; 29/623.4

(58) Field of Classification Search .............. 429/94, 429/56, 130, 161, 169, 211; 29/623.4
See application file for complete search history.

(56) References Cited

U.S. PATENT DOCUMENTS

| | | | | |
|---|---|---|---|---|
| 4,332,867 A | * | 6/1982 | Tsuda et al. ................... | 429/94 |
| 4,664,989 A | * | 5/1987 | Johnson ........................ | 429/94 |
| 4,892,796 A | * | 1/1990 | Chang et al. ............. | 429/161 X |
| 5,834,133 A | * | 11/1998 | Narukawa et al. ........ | 429/211 X |
| 6,143,442 A | * | 11/2000 | Takahashi et al. .......... | 429/94 X |
| 6,506,514 B1 | * | 1/2003 | Endo et al. ..................... | 429/94 |
| 6,790,557 B2 | * | 9/2004 | Xing et al. .................. | 429/211 |
| 2003/0077484 A1 | | 4/2003 | Cho | |
| 2003/0175587 A1 | * | 9/2003 | Okutani et al. ............ | 429/94 X |

FOREIGN PATENT DOCUMENTS

| | | |
|---|---|---|
| JP | 2004-172085 | 6/2004 |
| KR | 10-2004-0058917 | 7/2004 |

OTHER PUBLICATIONS

Korean Patent Abstracts for Publication No. 10-2004-0058917 A; dated Jul. 5, 2004 in the name of Gyeong Bu Do et al.

* cited by examiner

*Primary Examiner*—Stephen J. Kalafut
(74) *Attorney, Agent, or Firm*—Christie, Parker & Hale, LLP

(57) ABSTRACT

A secondary battery having an increased winding area of the electrode assembly due to an absent positive electrode terminal. An electrode plate of the electrode assembly is directly welded to the can for electrical connection and to prevent the electrode assembly from floating inside the can. The secondary battery includes a hexahedronal can having an opening formed on a side and an electrode assembly contained in the can. The electrode assembly has a first electrode plate, a separator, and a second electrode plate laminated and wound together. The first electrode plate is connected to the inner surface of the can and the second electrode plate is connected to an electrode tab extending a predetermined distance to the exterior. A cap assembly has a cap plate coupled to the opening of the can to which the electrode is welded and an electrode terminal is coupled to the electrode terminal.

20 Claims, 7 Drawing Sheets

SECONDARY BATTERY

CROSS-REFERENCE TO RELATED APPLICATION

This application claims priority to and the benefit of Korean Patent Application No. 10-2004-0077222 filed on Sep. 24, 2004 in the Korean Intellectual Property Office, the entire content of which is incorporated herein by reference.

BACKGROUND OF THE INVENTION

1. Field of the Invention

The present invention relates to a secondary battery, and more particularly to a secondary battery having increased capacity.

2. Description of the Related Art

In general, a secondary battery (for example, a lithium ion battery) may be classified into a square-type battery, a cylindrical battery, or a pouch battery. The square-type battery includes a hexahedronal can having an open side, an electrode assembly inserted into the can and adapted to be charged/discharged at a predetermined voltage, an electrolyte injected into the can to enable ions to move, and a cap assembly for covering the top of the can to prevent the electrode assembly and the electrolyte from escaping to the exterior. The cap assembly includes a cap plate coupled to the open region of the can with a negative electrode terminal coupled to the center thereof via an insulation gasket.

The electrode assembly is formed by laminating a negative electrode plate, a separator, and a positive electrode plate and winding them a number of times into a jelly roll configuration. A first end of a positive electrode tab is connected to the positive electrode plate and a second end is welded to the cap plate of the cap assembly.

Similarly, a first end of a negative electrode tab is connected to the negative electrode plate and a second end is connected to the negative electrode terminal of the cap assembly. Therefore, the cap plate and the can act as a positive electrode except for the negative electrode terminal formed on the cap assembly.

Such a conventional secondary battery has a problem in that the positive and negative electrode tabs welded to the electrode assembly have a relatively large thickness, and therefore the number of times the electrode assembly can be wound is limited. Particularly, the number of times the electrode assembly can be wound is reduced in proportion to the thickness of the positive and negative electrode tabs. As a result, the capacity of the secondary battery decreases. In addition, the positive and negative electrode tabs have insulation tape attached to a surface thereof to prevent them from being short-circuited to the negative and positive electrode plates having the opposite polarity, respectively. This further reduces the number of times the electrode assembly can be wound, as well as reducing the capacity of the secondary battery.

During the manufacturing process of such a conventional secondary battery, the positive and negative electrode tabs must be separately welded to the positive and negative electrode plates of the electrode assembly, respectively, as well as to the cap plate and the negative electrode terminal of the cap assembly. This makes the manufacturing process complicated and decreases the production yield.

The electrode assembly contained in the can may have a volume similar to the internal volume of the can during assembly and may float inside the can even when its volume is slightly smaller than the internal volume of the can. Such floating causes the positive electrode plate formed on the outermost surface of the electrode assembly to intermittently contact the can. The output voltage or current of the secondary battery may then fluctuate and the positive and negative electrode tabs may even separate from the electrode assembly or the cap assembly. Noise may also be generated as the electrode assembly floats inside the can.

SUMMARY OF THE INVENTION

In accordance with the present invention, a secondary battery is provided absent a positive electrode tab to increase the battery capacity by increasing the number of winds of the electrode assembly as much as the volume occupied by the positive electrode tab. There is also provided a secondary battery having an electrode plate welded to the can to directly connect the electrode assembly to the can to prevent the electrode assembly from floating inside the can and generating noise.

A secondary battery is provided including an approximately hexahedronal can having an opening formed on a side thereof; an electrode assembly contained in the can with a first electrode plate, a separator, and a second electrode plate laminated and wound a number of times, the first electrode plate being connected to the inner surface of the can and the second electrode plate being connected to an electrode tab extending a predetermined distance to the exterior; and a cap assembly having a cap plate coupled to the opening of the can and an electrode terminal coupled to the cap plate, to which the electrode tab is welded.

The secondary battery has the first electrode plate of the electrode assembly connected to the can electrically and mechanically without using a positive electrode tab and efficiently prevents the electrode assembly from floating inside the can.

Since the positive electrode tab is absent, the electrode assembly may be designed to have a greater volume inside a can having the same height, increasing the capacity of the secondary battery.

Since the positive electrode tab is absent, processes for connecting the positive electrode tab to the electrode assembly and to the cap plate may be omitted, and the productivity of the secondary battery improves accordingly.

The secondary battery may have insulation tape glued to a region corresponding to the short side of the electrode assembly to prevent the electrode assembly from being unwound and floating inside the can.

DETAILED DESCRIPTION

Figure 1:
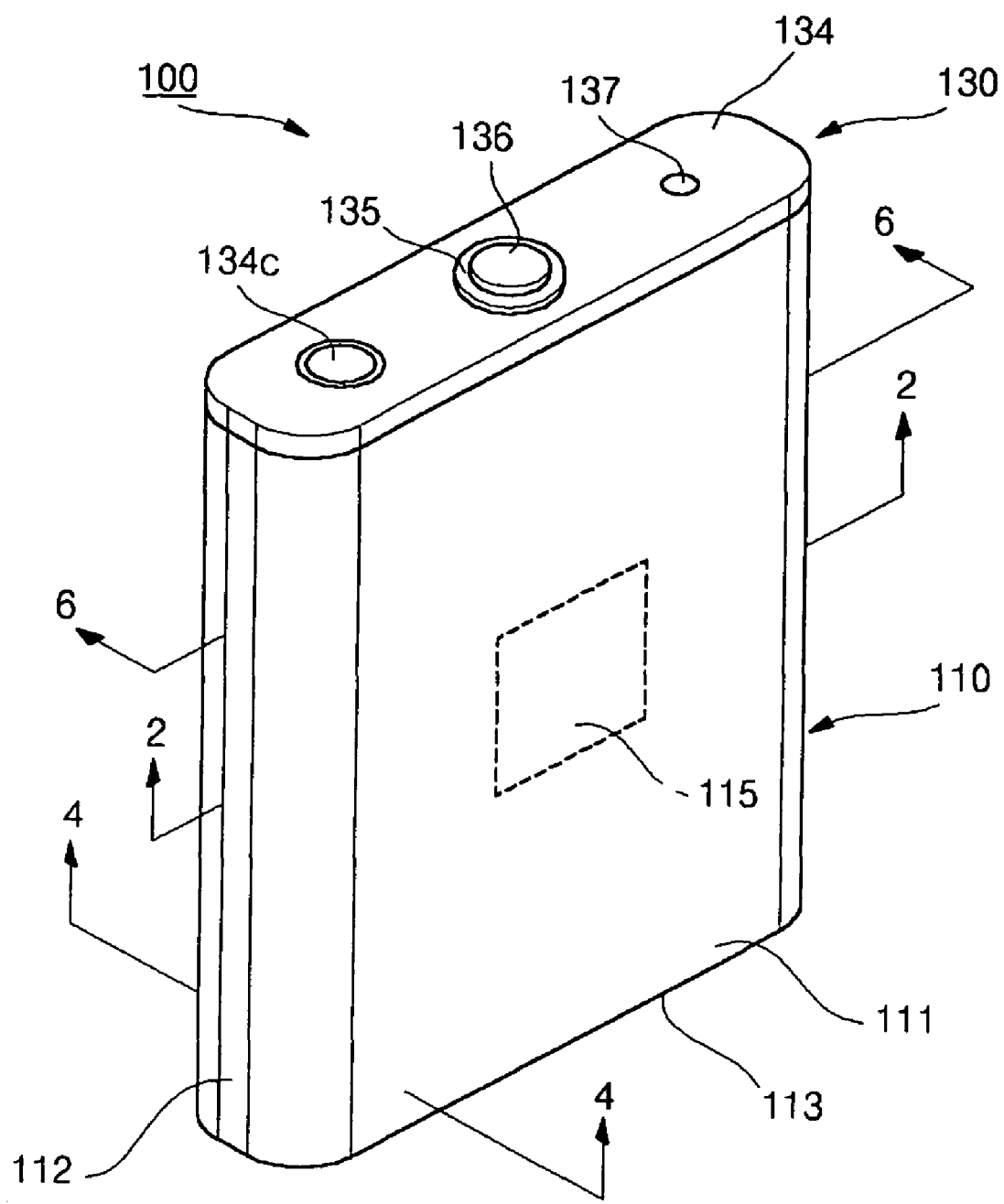
FIG. 1 is a perspective view showing a secondary battery according to an exemplary embodiment of the present invention.

As shown in FIG. 1, a secondary battery 100 includes an approximately hexahedronal can 110 and a cap assembly 130 for covering the top of the can 110. The can 110 has an electrode assembly and an electrolyte contained therein, described in more detail below.

The can 110 includes a pair of long-sided portions 111 having a relatively larger area and spaced a predetermined distance from each other, a pair of short-sided portions 112 having a smaller area and integrally formed around both sides of the long-sided portions 111, and a bottom portion 113 integrally formed around each remaining side of the long and short-sided portions 111, 112.

The short-sided portions 112 may have a predetermined curvature so that they have a shape similar to the winding shape of the electrode assembly 120 (described later) and so that little space remains inside the can 110. The short-sided portions 112 may also be generally perpendicular to the long-sided portions 111. However, the shape of the short-sided portions 112 is not limited to the shape described.

The can 110 may be made from any material chosen from aluminum, steel, stainless steel, copper, copper alloy, or an equivalent thereof. However, the material of the can 110 is not limited to those mentioned herein.

The long-sided portions 111 of the can 110 are mechanically and electrically connected and fixed to the electrode assembly 120. The can 110 may have a welding region 115 formed on the long-sided portions 111 where the diagonal lines intersect, but the position of the welding region 115 is not limited to that as shown and described. For example, the welding region 115 may be formed in any position on the long-sided portions 111. Although the welding region 115 is shown to have an approximately square shape, the shape of the welding region 115 is not limited thereto. For example, the welding region 115 may have various shapes including a circle, a triangle, or polka dotted, in addition to a square. The welding region 115 may be formed by ultrasonic welding, laser welding, resistance welding, or an equivalent thereof, but the welding method is not limited thereto.

The cap assembly 130 may be coupled to the top of the can 110 to prevent the electrode assembly 120 and the electrolyte from escaping to the exterior. Particularly, a cap plate 134 is connected to the can 110 opposite the bottom portion 113 and has a shape similar to that of the bottom portion 113. The cap plate 134 has an electrode terminal 136 coupled to the center thereof with an insulation gasket 135 interposed between them to avoid a short circuit, a ball 137 coupled and fixed next to a side of the electrode terminal 136 to prevent the electrolyte from leaking after injection, and a safety vent 134c formed next to the other side thereof with a relatively small thickness to be fractured for safety when the internal pressure of the can 110 rises. The safety vent 134c may be formed with any shape in any position on the long-sided portions 111, the short-sided portions 112, or the bottom portion 113 of the can 110, in addition to the cap plate 134, However, the shape and position of the safety vent 134c is not limited to those described herein.

Figure 2:
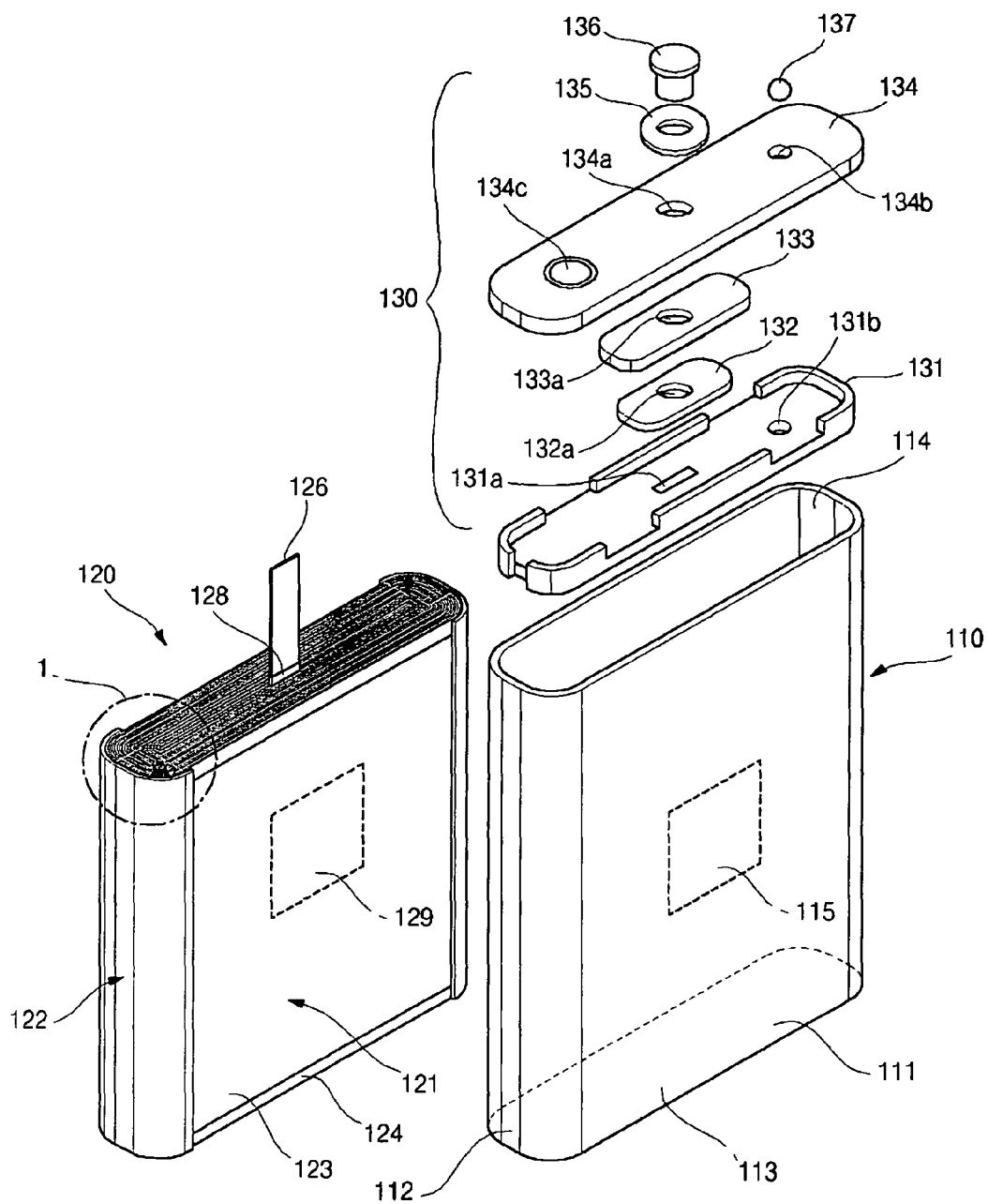
FIG. 2 is an exploded perspective view showing a secondary battery according to an exemplary embodiment of the present invention.

Referring to FIG. 2, the can 110 includes long-sided portions 111 having a welding region 115, short-sided portions 112, and a bottom portion 113. The can 110 has an opening 114 formed thereon opposite the bottom portion 113 so that an electrode assembly 120 may be inserted and coupled thereto.

The electrode assembly 120 is coupled to the interior of the can 110 via the opening 114 and has a height slightly smaller than that of the can 110 to secure an assembly space for a cap assembly 130. The electrode assembly 120 is approximately wound into a jelly roll configuration having long sides 121 and short sides 122. An electrode tab 126 extends upward a predetermined distance approximately from the center of the electrode assembly 120 and has insulation tape 128 attached to a surface thereof to avoid a short circuit As such, a single electrode tab 126 is inserted and fixed to the electrode assembly 120, and the winding area of the electrode assembly 120 further increases. As a result, a secondary battery 100 of the same size having an increased capacity may be obtained.

The electrode assembly 120 has insulation tape 127 (FIG. 3) glued to the short sides 122 thereof to efficiently prevent the electrode assembly 120 from being unwound, as well as to prevent the electrode assembly from floating when it is inserted into the can 110 by leaving little space. Particularly, the insulation tape 127 removes the gap generally formed between the short sides 122 of the electrode assembly 120 and the short-sided portions 112 of the can 110.

The electrode assembly 120 has a welding region 129 formed on the long sides 121 thereof, which correspond to the long-sided portions 111 of the can 110, for electrical and mechanical connection to the can 110. However, no insulation tape 127 is glued to the long-sided portions 111 for easy welding to the can 110.

The cap assembly 130 is positioned approximately on top of the electrode assembly 120. Particularly, an insulation case 131, a terminal plate 132, an insulation plate 133, a cap plate 134, and an insulation gasket 135 coupled to an electrode terminal 136 are successively positioned to constitute the cap assembly 130. The insulation case 131 has a through-hole 131a formed thereon so that the electrode tab 126 can extend through and an electrolyte injection hole 131b formed thereon for easy electrolyte injection.

The terminal plate 132, the insulation plate 133, and the cap plate 134 have through-holes 132a, 133a, and 134a formed thereon, respectively, so that the electrode terminal 136 can be easily coupled thereto. The cap plate 134 has an electrolyte injection hole 134b formed thereon for electrolyte injection, to which a ball 137 is coupled and welded, and a safety vent 134c formed next to a side thereof, which is adapted to be fractured when the internal pressure of the battery rises and secures safety.

Figure 3:
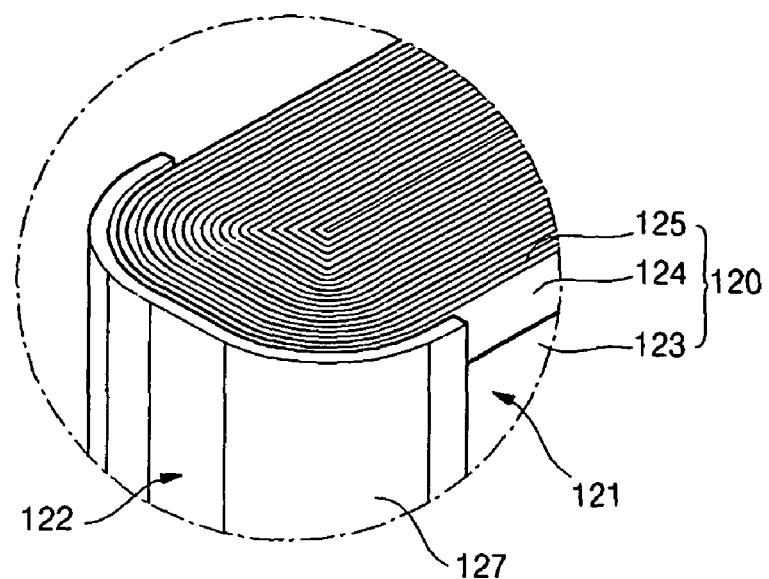
FIG. 3 is a magnified perspective view of region 1 of FIG. 2.

Referring to FIG. 3, a magnified perspective view of region 1 of FIG. 2 is illustrated. As shown, the electrode assembly 120 has a first electrode plate 123, a separator 124, and a second electrode plate 125 positioned from the exterior to the interior which are wound a number of times while being laminated. The short side 122 of the electrode assembly 120 is enclosed by the insulation tape 127, while the first electrode plate 123 is directly exposed through the long side 121 for electrical and mechanical connection to the can 110. The separator 124 has a height slightly larger than that of the first and second electrode plates 123, 125 to prevent a short circuit from occurring in the upper or lower end of the first and second electrode plates 123, 125.

The first electrode plate 123 may be made of conventional aluminum foil and may be coated with a positive electrode active material (for example, lithium cobalt oxide ($LiCoO_2$), lithium nickel oxide ($LiNiO_2$), lithium manganese oxide ($LiMn_2O_4$), or an equivalent thereof on its surface. The separator 124 may be made of polyethylene (PE) or polypropylene (PP). The second electrode plate 125 may be made of copper foil and may be coated with a negative electrode active material (for example, graphite or an equivalent thereof on its surface. The first and second electrode plates 123, 125 generally act as positive and negative electrodes, respectively. However, the type of metal and active materials of the first and second electrode plates 123 and 125 are not limited herein and may be switched. In other words, the first and second electrode plates 123, 125 may act as negative and positive electrode plates, respectively.

The first electrode plate 123 is absent positive electrode active material formed in the outermost region thereof, which contacts the interior of the can 110, for easy welding to the can 110. This is because the outermost region of the first electrode plate 123 does not undergo a chemical reaction with the second electrode plate 125 and needs no positive electrode active material.

Figure 4:
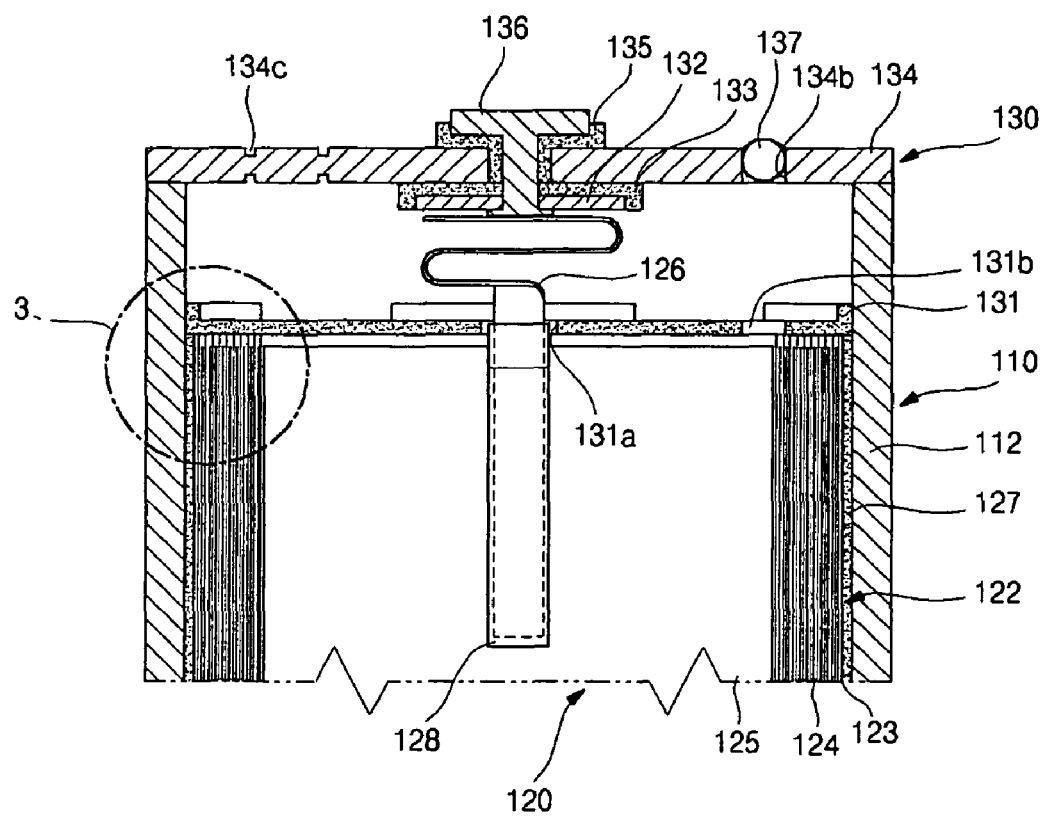
FIG. 4 is a sectional view taken along line 2-2 of FIG. 1.

Referring to FIG. 4, the electrode assembly 120 has insulation tape 127 attached to the short sides 122 thereof which correspond to the short-sided portions 112 of the can 110. Therefore, the short sides 122 of the electrode assembly 120 are firmly fastened to the short-sided portions 112 of the can 110 and do not float The electrode assembly 120 has an electrode tab 126 connected to the second electrode plate 125 thereof, which extends upward a predetermined distance through the through-hole 131a of the insulation case 131. The electrode tab 126 thus has the same polarity as the second electrode plate 125. The electrode tab 126 has insulation tape 128 attached to a surface thereof with a predetermined length to prevent the electrode tab 126 from being short-circuited to the first electrode plate 123. The second electrode plate 125 has no negative electrode active material formed thereon for easy welding to the electrode tab 126.

The electrode terminal 136 is coupled to the cap plate 134 of the cap assembly 130 via the insulation gasket 135 while being connected to the electrode tab 126. The electrode terminal 136 thus has the same polarity as the second electrode plate 125 and the electrode tab 126. When the second electrode plate 125 has a negative polarity, for example, the electrode terminal 136 also has a negative polarity. Alternately, when the second electrode plate 125 has a positive polarity, the electrode terminal 136 also has a positive polarity. The first electrode plate 123 is directly welded to the can 110 and has the same polarity as the can 110 and the cap plate 134. When the first electrode plate 123 has a positive polarity, for example, the can 110 and the cap plate 134 also have a positive polarity. When the first electrode plate 123 has a negative polarity, the can 110 and the cap plate 134 also have a negative polarity.

The insulation plate 133 and the terminal plate 132 extend through the cap plate 134 from below and are connected to the electrode terminal 136 to prevent it from dislodging from the cap plate 134.

Figure 5:
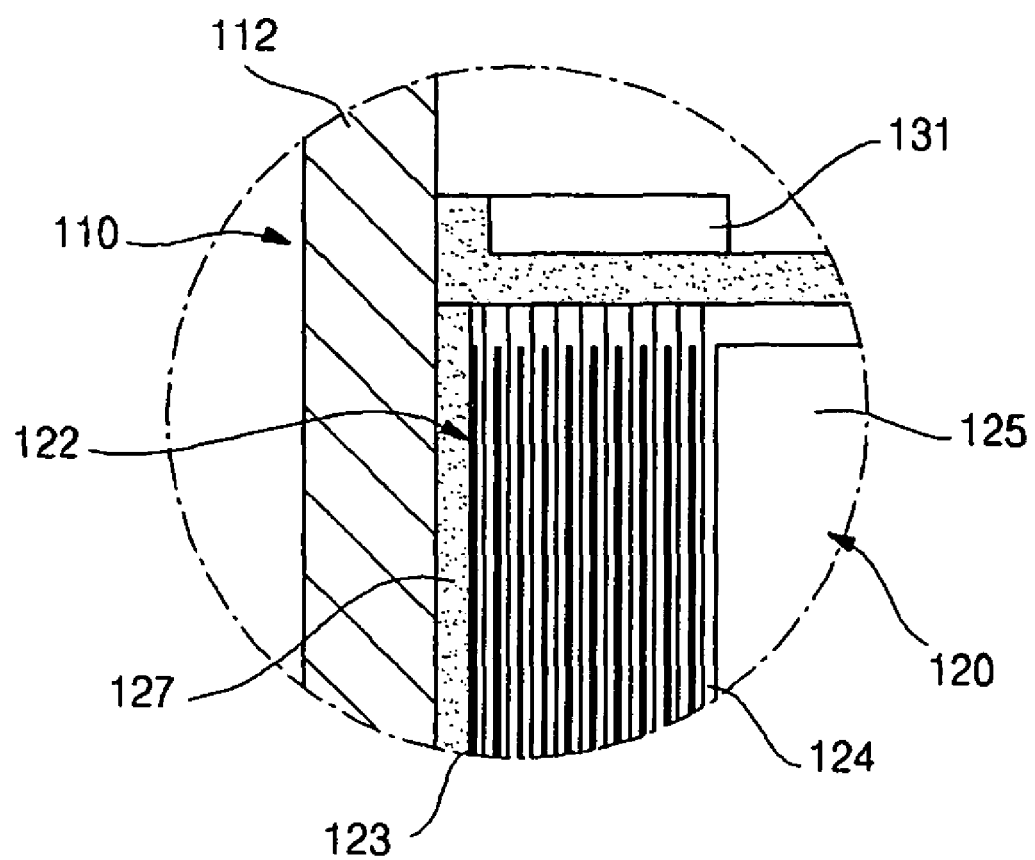
FIG. 5 is a magnified sectional view of region 3 of FIG. 4.

Referring to FIG. 5, which illustrates a magnified section view of region 3 of FIG. 4, the insulation tape 127 is interposed between the short-sided portion 112 of the can 110 and the short side 122 of the electrode assembly 120. The insulation tape 127 is glued to the short side 122 of the first electrode plate 123 of the electrode assembly 120. The insulation case 131 is fastened to the top of the electrode assembly 120. As such, the electrode assembly 120 is prevented from floating toward the short-sided portion 112 of the can 110 by the insulation tape 127, as well as toward the top or bottom of the can 110 by the insulation case 131.

Figure 6:
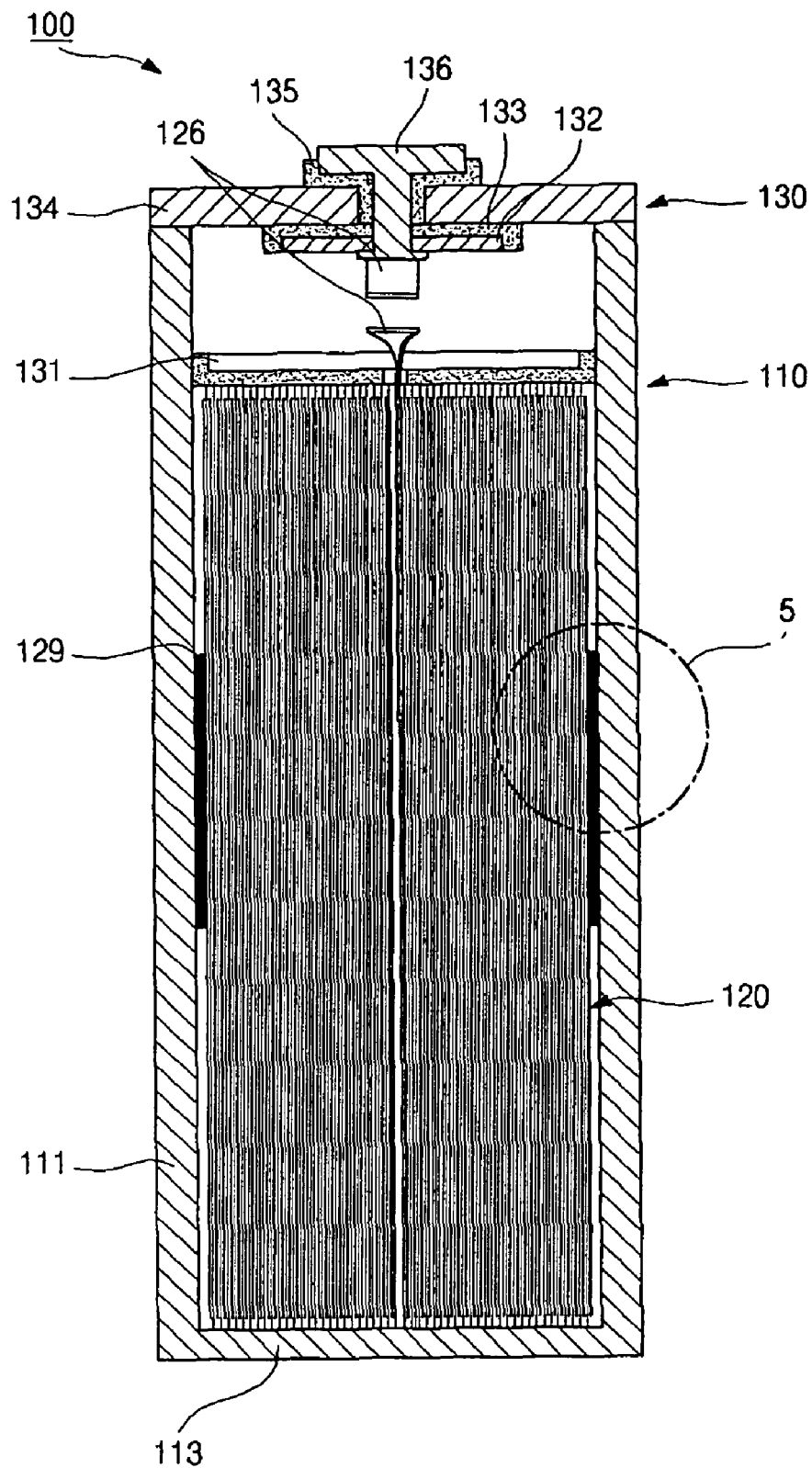
FIG. 6 is a sectional view taken along line 4-4 of FIG. 1.

Referring to FIG. 6, the can 110 may have welding regions 129 formed on both opposing long-sided portions 111. The electrode assembly 120 is then electrically and mechanically fixed to both long-sided portions 111. This allows for stable fixation structure and avoids floating and noise generation. The welding regions 129 may be formed approximately at the center of the opposing long-sided portions 111, respectively, so that the electrode assembly 120 may be fixed to the can 110 in opposing directions. However, the configuration of the welding regions 129 is not limited in the present invention and the welding regions 129 may be formed in an asymmetrical configuration. Particularly, a welding region 129 formed between one long-sided portion 111 and the electrode assembly 120 may be asymmetrically positioned and shaped relative to another welding region 129 formed between the other long-sided portion 111 and the electrode assembly 120.

The welding region 129 may be formed by interposing an additional member between the long-sided portion 111 of the can 110 and the first electrode plate 123, instead of melting them to each other. For example, a solder paste may be interposed between the can 110 and the electrode assembly 120 and is subjected to a reflow process at a predetermined temperature (approximately 150-250° C.), so that the solder paste melts and connects the can 110 to the electrode assembly 120 mechanically and electrically. The additional member may be a conventional conductive film, an anisotropic conductive film, a conductive paste, a conductive plate, or an equivalent thereof, but is not limited herein.

Figure 7:
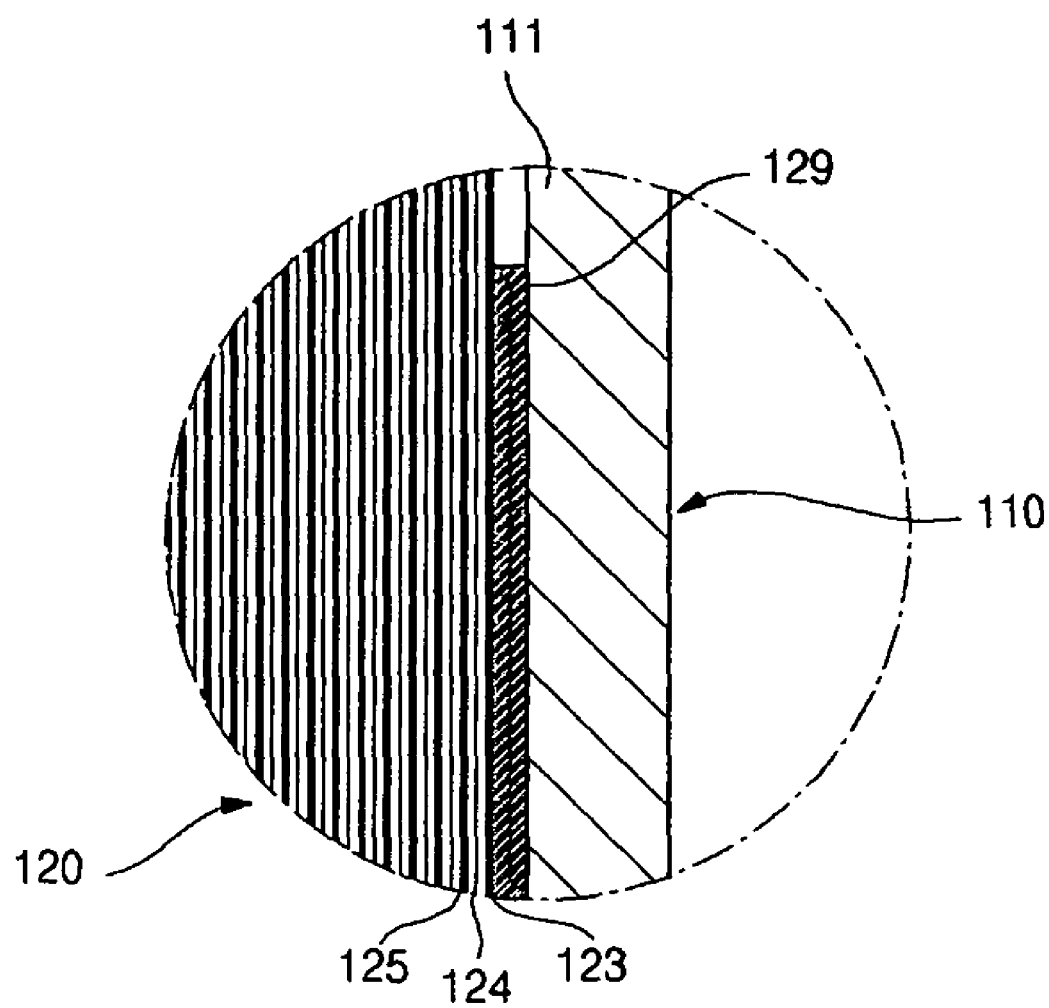
FIG. 7 is a magnified sectional view of region 5 of FIG. 6.

Referring to FIG. 7, which illustrates a magnified section view of region 5 of FIG. 6, the first electrode plate 123 of the electrode assembly 120 is welded to the long-sided portion 111 of the can 110. Particularly, a welding region 129 is formed between the first electrode plate 123 and the long-sided portion 111. The second electrode plate 125 is positioned on the inner side of the first electrode plate 123 with a separator 124 interposed between them to avoid a short circuit between the first and second electrode plates 123, 125. When the welding is performed in an ultrasonic mode, the shallowness of the welding further decreases the possibility of a short circuit. Particularly, the electrode assembly 120 is inserted into the can 110 and ultrasonic waves are applied to a predetermined portion of the long-sided portion 111 of the can 110 to weld the long-sided portion 111 to the first electrode plate 123 of the electrode assembly 120. However, the mode of welding is not limited in the present invention and conventional laser welding, resistance welding, or an equivalent thereof may also be used.

Figure 8:
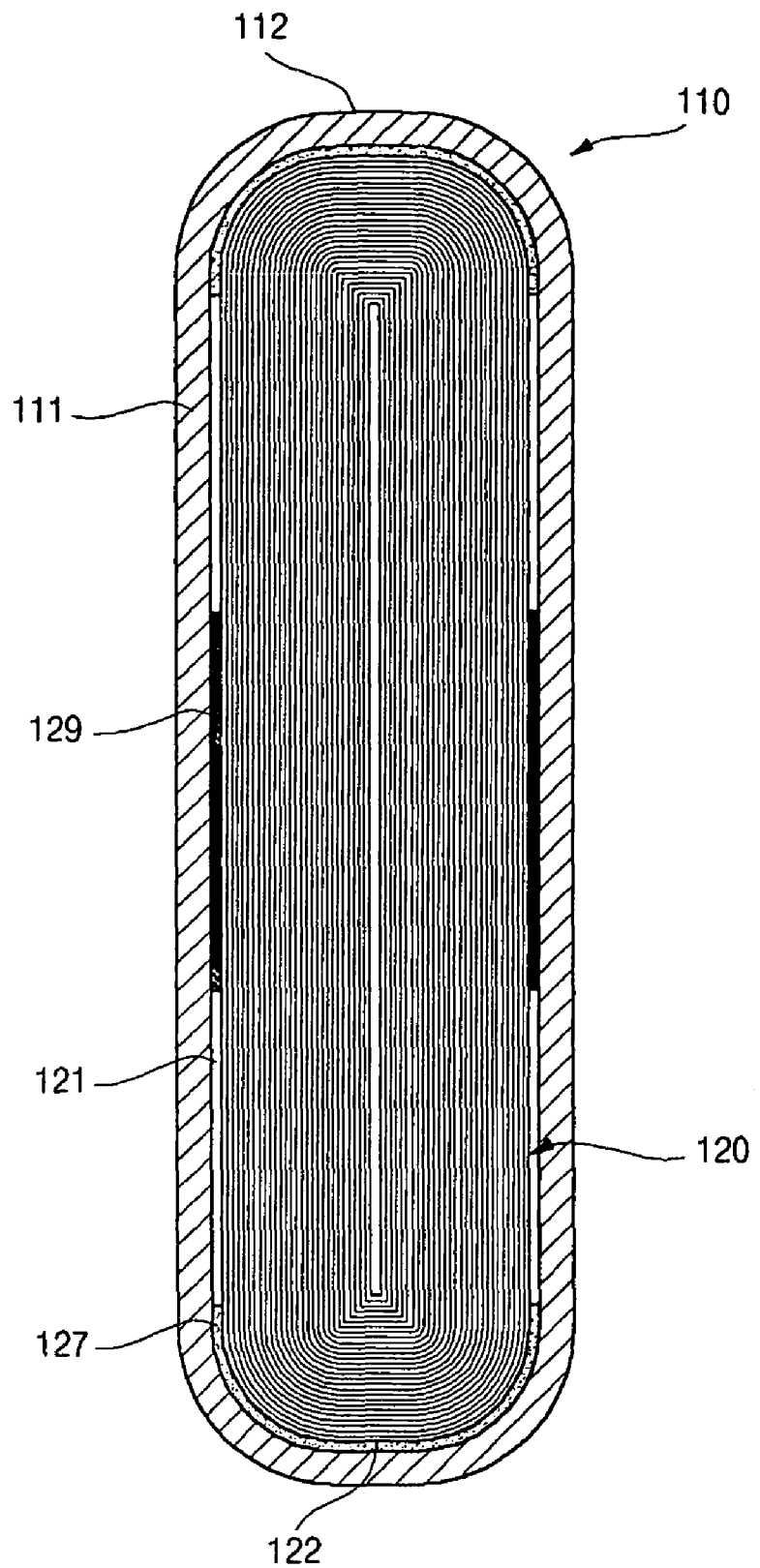
FIG. 8 is a sectional view taken along line 6-6 of FIG. 1.

Referring to FIG. 8, the can 110 includes long-sided portions 111 spaced a predetermined distance from each other and short-sided portions 112 formed around the peripheries thereof. The short sided portions 112 may have a predetermined curvature. Since the short sides 122 of the electrode assembly 120 are also wound with a predetermined curvature, little space exists between the short-sided portions 112 of the can 110 and the short sides 122 of the electrode assembly 120. The insulation tape 127 glued to the short sides 122 of the electrode assembly 120 further lessens the gap between the short-sided portions 112 of the can 110 and the short sides 122 of the electrode assembly 120 and prevents the electrode assembly 120 from floating and generating noise inside the can 110 in a more efficient manner.

The long sides 121 of the electrode assembly 120 are welded to the long-sided portions 111 of the can 110. Particularly, welding regions 129 are formed between the long sides 121 of the first electrode plate 123 of the electrode assembly 120 and the long-sided portions 111 of the can 110. The welding regions 129 fix the electrode assembly 120 to the can 110 electrically and mechanically. Therefore, voltage and current are directly transmitted from the first electrode plate 123 of the electrode assembly 120 to the can 110 and the electrode assembly 120 is prevented from floating inside the can 110.

As described above, an exemplary secondary battery has the first electrode plate of the electrode assembly connected to the can electrically and mechanically without using a positive electrode tab as in the prior art and efficiently prevents the electrode assembly from floating inside the can.

Since the positive electrode tab is absent, the electrode assembly can be designed to have an increased volume inside a can having the same height, thereby increasing capacity.

Processes for connecting the positive electrode tab to the electrode assembly and to the cap plate can be omitted, as the positive electrode tab is absent, and the productivity of the secondary battery improves accordingly.

The secondary battery has insulation tape glued to a region corresponding to the short side of the electrode assembly to prevent the electrode assembly from being unwound and floating inside the can.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
   a generally hexahedronal can having a top opening and a bottom portion;
   an electrode assembly in the can, the electrode assembly including a first electrode plate, a separator, and a second electrode plate laminated and wound a number of times, the first electrode plate being welded, soldered or adhered to an inner surface of the can at an attachment region where the first electrode plate and the inner surface overlap, and the second electrode plate being connected to an electrode tab extending from the second electrode plate;
   a cap assembly comprising a cap plate covering the top opening of the can and an electrode terminal coupled to the cap plate, and
   an insulation case between the electrode assembly and the cap assembly; and
   wherein the electrode tab is attached to the electrode terminal, and
   wherein the attachment region is entirely between the insulation case and the bottom portion.

2. The secondary battery as claimed in claim 1,
   wherein the can includes a pair of long-sided portions having a first area and spaced from each other, a pair of short-sided portions having a second area and integral with the long-sided portions, and wherein the bottom portion is integral with the pair of long-sided portions and the pair of short-sided portions, and
   wherein the first area is larger than the second area.

3. The secondary battery as claimed in claim 2, wherein the pair of short-sided portions are curved.

4. The secondary battery as claimed in claim 2, wherein each of the short-sided portions define a plane that is substantially perpendicular to a plane defined by each of the long-sided portions.

5. The secondary battery as claimed in claim 2, wherein the pair of long-sided portions are electrically and mechanically connected to the first electrode plate of the electrode assembly.

6. The secondary battery as claimed in claim 2, wherein the pair of long-sided portions and the first electrode plate of the electrode assembly are electrically and mechanically connected at a welding region of each of the pair of long-sided portions.

7. The secondary battery as claimed in claim 5, wherein the pair of long-sided portions of the can are connected to the first electrode plate of the electrode assembly at a central region of the first electrode plate.

8. The secondary battery as claimed in claim 1, wherein the can comprises aluminum, steel, stainless steel, copper, and copper alloy.

9. The secondary battery as claimed in claim 1,
   wherein the electrode assembly is wound into a jelly roll configuration having a long side and a short side, and
   wherein insulation tape is attached to a region of the electrode assembly corresponding to the short side to prevent the electrode assembly from floating inside the can.

10. The secondary battery as claimed in claim 1, wherein the electrode terminal of the cap assembly is coupled to the cap plate with an insulation gasket between the electrode terminal and the cap plate.

11. The secondary battery as claimed in claim 1, wherein the insulation case has a through-hole for allowing the electrode tab to be connected to the electrode terminal.

12. The secondary battery as claimed in claim 1, wherein the first electrode plate and the second electrode plates are coated with a positive electrode active material and a negative electrode active material, respectively.

13. The secondary battery as claimed in claim 1, wherein insulation tape is attached to a surface of the electrode tab to prevent the electrode tab from being short-circuited with the first electrode plate.

14. The secondary battery as claimed in claim 1, wherein an electrolyte injection hole configured for electrolyte injection is on the cap plate, a ball insertable into and weldable to the electrolyte injection hole.

15. The secondary battery as claimed in claim 1, wherein a safety vent is on the cap plate, the safety vent adapted to fracture when internal pressure of the secondary battery reaches a threshold level.

16. The secondary battery as claimed in claim 1, wherein the first electrode plate is connectable to the inner surface of the can by any one chosen from a group comprising a conductive film, an anisotropic conductive film, and a conductive paste.

17. A method of manufacturing a secondary battery, the secondary battery including a can having an opening, an electrode assembly in the can, the electrode assembly having a first electrode plate, a second electrode plate and a separator laminated together and wound, and a cap assembly having a cap plate covering the opening, the method comprising:
   welding, soldering or adhering the first electrode plate to an inner surface of the can at a region where the first electrode plate and the inner surface overlap;
   connecting the second electrode plate to an electrode tab extending from the can;
   connecting the electrode tab to an electrode terminal through the cap plate, and
   coupling the cap assembly to the can.

18. The method of claim 17,
   wherein the electrode assembly is wound into a jelly roll configuration having a long side and a short side, and
   wherein insulation tape is attached to a region of the electrode assembly corresponding to the short side to prevent the electrode assembly from floating inside the can.

19. The method of claim 17,
   wherein insulation tape is glued to a surface of the electrode tab to prevent the electrode tab from being short-circuited with the first electrode plate.

20. The method of claim 17,
   wherein a safety vent is on the cap plate, the safety vent being adapted to fracture when internal pressure of the secondary battery reaches a threshold level.

* * * * *